(12) United States Patent
Kim

(10) Patent No.: US 10,979,126 B2
(45) Date of Patent: Apr. 13, 2021

(54) METHOD BY WHICH TERMINAL DETERMINES BEAM IN WIRELESS COMMUNICATION SYSTEM AND TERMINAL THEREFOR

(71) Applicant: Samsung Electronics Co., Ltd., Gyeonggi-do (KR)

(72) Inventor: Soenghun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 48 days.

(21) Appl. No.: 16/471,373

(22) PCT Filed: Dec. 21, 2017

(86) PCT No.: PCT/KR2017/015257
§ 371 (c)(1),
(2) Date: Jun. 19, 2019

(87) PCT Pub. No.: WO2018/117693
PCT Pub. Date: Jun. 28, 2018

(65) Prior Publication Data
US 2019/0334607 A1 Oct. 31, 2019

(30) Foreign Application Priority Data
Dec. 21, 2016 (KR) .......................... 10-2016-0175920

(51) Int. Cl.
*H04B 7/06* (2006.01)
*H04B 7/08* (2006.01)
(Continued)

(52) U.S. Cl.
CPC ......... *H04B 7/0695* (2013.01); *H04B 7/0408* (2013.01); *H04B 7/0413* (2013.01); *H04B 7/088* (2013.01)

(58) Field of Classification Search
CPC ..... H04W 16/28; H04W 36/08; H04W 48/20; H04W 56/0075; H04W 72/046;
(Continued)

(56) References Cited

U.S. PATENT DOCUMENTS

| 2010/0271274 A1 | 10/2010 | Gibson et al. |
| 2012/0064841 A1 | 3/2012 | Husted et al. |

(Continued)

FOREIGN PATENT DOCUMENTS

WO    WO 2013/012185    1/2013

OTHER PUBLICATIONS

European Search Report dated Jul. 8, 2019 issued in counterpart application No. 17883024.6-1220, 7 pages.
(Continued)

*Primary Examiner* — Michael Thier
*Assistant Examiner* — Prince A Mensah
(74) *Attorney, Agent, or Firm* — The Farrell Law Firm, P.C.

(57) ABSTRACT

The present disclosure relates to a communication method for merging, with IoT technology, a 5G communication system for supporting a data transmission rate higher than that of a 4G system, and a system therefor. The present disclosure can be applied to intelligent services (for example, smart home, smart building, smart city, smart car or connected car, healthcare, digital education, retail business, security and safety related service and the like) on the basis of 5G communication technology and IoT related technologies. The present disclosure relates to a method by which a terminal determines a beam in a wireless communication system, comprising the steps of: performing a beam sweeping procedure of discovering a reception beam of the terminal and a transmission beam of a transmission reception point (TRP) of the wireless communication system, the
(Continued)

orienting directions of the reception beam and the transmission beam being aligned to each other; determining a rotation angle of the rotated terminal by using a rotation detection sensor provided to the terminal when the terminal is rotated after the beam sweeping procedure is performed; determining a reception beam on which a downlink signal is to be received on the basis of the determined rotation angle when the determined rotation angle is a predetermined angle or greater.

10 Claims, 11 Drawing Sheets

(51) Int. Cl.
*H04B 7/0408* (2017.01)
*H04B 7/0413* (2017.01)

(58) Field of Classification Search
CPC .............. H04W 72/048; H04W 72/085; H04B 7/0408; H04B 7/0413; H04B 7/0695; H04B 7/088
See application file for complete search history.

(56) References Cited

U.S. PATENT DOCUMENTS

| | | |
|---|---|---|
| 2013/0017836 A1 | 1/2013 | Chang et al. |
| 2013/0040682 A1 | 2/2013 | Chang et al. |
| 2013/0072243 A1 | 3/2013 | Yu et al. |
| 2014/0091968 A1 | 4/2014 | Harel et al. |
| 2019/0319686 A1* | 10/2019 | Chen, IV ............ H04W 72/046 |

OTHER PUBLICATIONS

PCT/ISA/210 Search Report issued on PCT/KR2017/015257, pp. 5. 1.
PCT/ISA/237 Written Opinion issued on PCT/KR2017/015257, pp. 7.
ZTE, ZTE Microelectronics, 3GPP TSG RAN WG1 Meeting #87 R1-1611474, Reno, USA, Nov. 6, 2016, High level views on beam management for NR-MIMO, pp. 8.
ZTE, ZTE Microelectronics, ASTRI, 3GPP TSG RAN WG1 Meeting #87 R1-1613740, Reno, USA, Nov. 6, 2016, WF on Group-based Beam Management, pp. 5.
Samsung, 3GPP TSG RAN WG1 Meeting #87 R1-1612517, Reno, USA, Nov. 4, 2016, Discussion on beam grouping, pp. 6.

* cited by examiner

METHOD BY WHICH TERMINAL DETERMINES BEAM IN WIRELESS COMMUNICATION SYSTEM AND TERMINAL THEREFOR

PRIORITY

This application is a National Phase Entry of PCT International Application No. PCT/KR2017/015257 which was filed on Dec. 21, 2017, and claims priority to Korean Patent Application No. 10-2016-0175920, which was filed on Dec. 21, 2016, the content of each of which is incorporated herein by reference.

TECHNICAL FIELD

The present invention relates to a terminal and method for the terminal to determine a reception beam for receiving the downlink signal in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The 5G communication system is also called a new radio access technology (NR). The NR system aims to provide ultra-high-speed data services of several Gbps using an ultra-wideband above 100 MHz bandwidth compared to current LTE and LTE-A. However, as it is difficult to obtain an ultra-wideband frequency of 100 MHz or more in frequency bands of several hundred MHz or several GHz used in LTE and LTE-A, the NR system considers transmitting a signal using a wide frequency band existing in frequency bands of 6 GHz or more. Specifically, the NR system considers increasing the transmission rate by using the millimeter wave (mmWave) band such as the 28 GHz band or the 60 GHz band. However, as the pathloss of the radio wave is proportional to the frequency, the pathloss of the radio wave is large in such an ultra-high frequency, so that the service area becomes small.

To overcome this service area reduction in the NR system, the beamforming technique is becoming important that uses a plurality of antennas to generate a directional beam to increase the propagation distance of the radio wave. The beamforming technique can be applied to the transmitter and the receiver, and it can also reduce the interference due to the physical beam concentration in the target direction in addition to the enlargement of the service area.

DISCLOSURE OF INVENTION

Technical Problem

When the beamforming technique is used in the NR system, to ensure communication quality, the direction of the downlink transmission beam of the transmission reception point (TRP) (here, the TRP is an apparatus for transmitting and receiving radio signals in the network, and may be a base station (5G NB) or a device connected to a 5G NB) and the direction of the downlink reception beam of the terminal can be aligned with each other.

However, when the terminal is moved or rotated in a state where the transmission beam and the reception beam are aligned, the direction of the transmission beam and the direction of the reception beam may misalign each other.

If the directions are misaligned, the communication quality may deteriorate rapidly. In addition, a considerable amount of time may be required for the beam recovery procedure to achieve alignment between the direction of the transmission beam and the direction of the reception beam.

Accordingly, an aspect of the present invention is to minimize deterioration of the communication quality that can be caused by movement or rotation of the terminal.

Aspects or objects of the present invention are not limited to those described above. Other aspects and salient features of the present invention will become apparent to those skilled in the art from the following description.

Solution to Problem

In accordance with an aspect of the present invention, there is provided a method of beam determination for a terminal in a wireless communication system. The method may include: performing a beam sweeping procedure to find a reception beam of the terminal and a transmission beam of a transmission reception point (TRP) whose directions are aligned with each other in the wireless communication system; determining, when the beam sweeping procedure is performed and the terminal is rotated, the rotation angle of the terminal by using a rotation detection sensor of the terminal; and determining, if the determined rotation angle is greater than or equal to a threshold angle, a reception beam to receive a downlink signal based on the determined rotation angle.

In accordance with another aspect of the present invention there is provided a method of beam determination for a terminal in a wireless communication system. The method may include: performing a beam sweeping procedure to find a reception beam of the terminal and a transmission beam of a transmission reception point (TRP) whose directions are aligned with each other in the wireless communication system; determining, when the beam sweeping procedure is performed and the terminal is moved, a degree of movement of the terminal by using a movement detection sensor of the terminal; and re-performing, if the degree of movement is greater than or equal to a threshold value, the beam sweeping procedure.

In accordance with another aspect of the present invention, there is provided a terminal capable of beam determination in a wireless communication system. The terminal may include: a sensor configured to measure an angle of the terminal; a transceiver configured to communicate with a transmission reception point (TRP) in the wireless communication system; and a controller. The controller may be configured to: perform a beam sweeping procedure to find a reception beam of the terminal and a transmission beam of the TRP whose directions are aligned with each other; determine, when the beam sweeping procedure is performed and the terminal is rotated, a rotation angle of the terminal by using the sensor; and determine, if the determined rotation angle is greater than or equal to a threshold angle, a reception beam to receive the downlink signal based on the determined rotation angle.

In accordance with another aspect of the present invention, there is provided a terminal capable of beam determination in a wireless communication system. The terminal may include: a sensor configured to measure a movement of the terminal; a transceiver configured to communicate with a transmission reception point (TRP) in the wireless communication system; and a controller. The controller may be configured to: perform a beam sweeping procedure to find a reception beam of the terminal and a transmission beam of the TRP whose directions are aligned with each other; determine, when the beam sweeping procedure is performed and the terminal is moved, a degree of movement of the terminal by using the sensor; and re-perform, if the degree of movement is greater than or equal to a threshold value, the beam sweeping procedure.

Advantageous Effects of Invention

In a feature of the present invention, when the terminal is rotated, it is possible to rapidly align the direction of the transmission beam and the direction of the reception beam. That is, the time during which the communication quality degrades due to the rotation of the terminal can be minimized.

In another feature of the present invention, when the terminal is moved, the beam sweeping procedure is performed in advance based on the degree of movement of the terminal, so that deterioration of the communication quality can be prevented.

Other features or advantages obtainable or predicted from the embodiments of the present invention will be directly or implicitly disclosed in the detailed description. For example, various predicted effects of the embodiments of the present invention will be disclosed within the following detailed description.

MODE FOR THE INVENTION

Figure 1A:
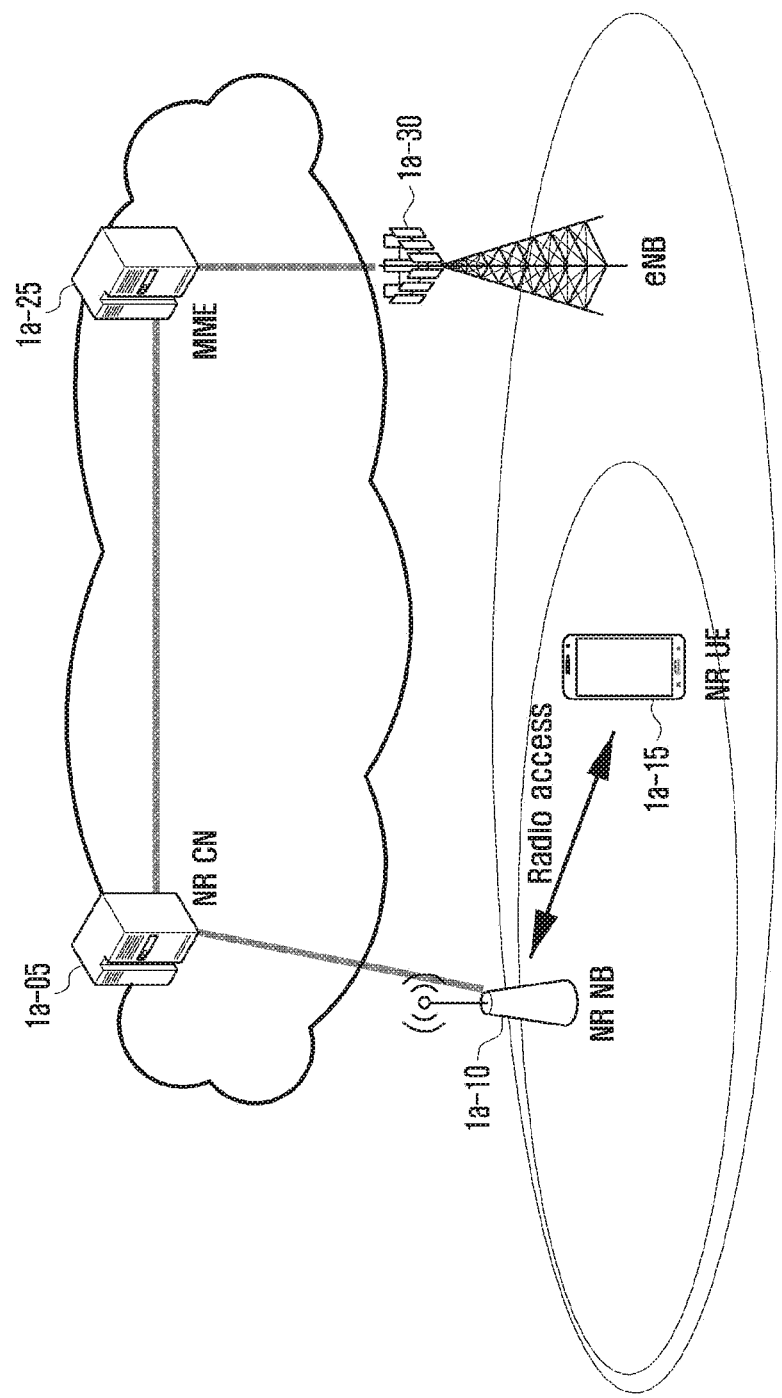
FIG. 1A illustrates the architecture of a wireless communication system.

Hereinafter, embodiments of the present invention are described in detail with reference to the accompanying drawings. The same or similar reference symbols are used throughout the drawings to refer to the same or like parts. Descriptions of well-known functions and structures incorporated herein may be omitted to avoid obscuring the subject matter of the present invention. The terms described below are defined in consideration of their functions in the present invention, and these may vary depending on the intention of the user, the operator, or the custom. Hence, their meanings should be determined based on the overall contents of this specification.

In the description, the singular forms "a", "an" and "the" are intended to include the plural forms as well, unless the context clearly indicates otherwise.

In the description, the terms "1st" or "first" and "2nd" or "second" may use corresponding components regardless of importance or order and are used to distinguish one component from another without limiting the components. For example, a first component may be denoted as a second component, and vice versa, without departing from the scope of the present invention. The term "and/or" used in the context of the "X and/or Y" should be interpreted as "X", or "Y", or "X and Y".

Some terms used herein may be provided merely to describe a specific embodiment without limiting the scope of another embodiment. In the description, the singular forms are intended to include the plural forms as well unless the context clearly indicates otherwise. It will be understood that the terms "comprising", "including", "having" and variants thereof, when used in this specification, specify the presence of stated features, figures, steps, operations, elements, components, or combinations thereof, but do not preclude the presence or addition of one or more other features, figures, steps, operations, elements, components, or combinations thereof.

In the description, the words or phrase "associated with", "associated therewith" and variants thereof may mean the following expressions "include", "be included within", "interconnect with", "contain", "be contained within", "connect to or with", "couple to or with", "be communicable with", "cooperate with", "interleave", "juxtapose", "be proximate to", "be bound to or with", "have", and "have a property of".

It will be understood that when an element (e.g., first element) is referred to as being (operatively or communicatively) "coupled with/to" or "connected with/to" another element (e.g., second element), it can be coupled or connected with/to the other element directly or via a third element.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Prior to the detailed description, some terms or definitions necessary to understand the present invention are described. However, these terms should be construed in a non-limiting way.

The "base station" is an entity that communicates with a terminal and allocates communication network resources to the terminal, and may be referred to as BS, NodeB (NB), eNodeB (eNB), NG RAN (next generation radio access network), wireless access unit, base station controller, or node on the network.

The "terminal (or, communication terminal)" is an entity communicating with a base station or another terminal, and may be referred to as node, user equipment (UE), NG UE (next generation UE), mobile station (MS), mobile equipment (ME), or device.

The terminal may be at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a medical instrument, a camera, or a wearable device. The terminal may be at least one of a television (TV), a digital versatile disc (DVD) player, an audio player, a refrigerator, an air conditioner, a cleaner, an oven, a microwave oven, a washing machine, an air purifier, a set-top box, a home automation control panel, a security control panel, a media box (e.g., Samsung Home-Sync™, Apple TV™, or Google TV™), a game console (e.g., Xbox™ or PlayStation™), an electronic dictionary, an electronic key, a camcorder, or a digital photo frame. The terminal may be at least one of a medical device (e.g., portable medical meter (such as a blood glucose meter, a heart rate meter, a blood pressure meter, or a temperature meter), a magnetic resonance angiography (MRA) instrument, a magnetic resonance imaging (MRI) instrument, a computed tomography (CT) instrument, a medical scanner, or an ultrasonic device), a navigation equipment, a global navigation satellite system (GNSS), an event data recorder (EDR), a flight data recorder (FDR), an automotive infotainment device, a marine electronic equipment (e.g., a marine navigation device, and a gyro compass or the like), avionics, a security device, a car head unit, an industrial or home robot, a drone, an automatic teller machine (ATM) for banks, a point-of-sale (POS) system for shops, or an internet of things (IoT) device (e.g., an electronic bulb, a sensor, a sprinkler device, a fire alarm, a thermostat, a streetlamp, a toaster, a fitness equipment, a hot-water tank, a heater, or a boiler).

In addition, the terminal may be one of various types of multimedia systems capable of performing communication functions.

Next, embodiments of the present invention are described with reference to the accompanying drawings.

FIG. 1A shows the architecture of an NR (new radio access technology) system as an example of a wireless communication system.

As shown in FIG. 1A, the NR system may include a next generation base station (new radio node B (NR NB)) 1a-10 and a next generation core network (new radio core network (NR CN)) 1a-05. A user terminal (new radio user equipment (NR UE) or terminal) 1a-15 can access an external network through the NR NB 1a-10 and the NR CN 1a-05.

In FIG. 1A, the NR NB 1a-10 can perform a role corresponding to that of the eNB (evolved node B) in the existing LTE system. The NR NB 1a-10 is connected to the NR UE 1a-15 via a radio channel, and can provide a higher level of service compared with the existing node B. In the NR system, as all user traffic is served through a shared channel, a scheduling apparatus is required that collects state information regarding the buffer state, available transmission power, and channel state of each terminal. The NR NB 1a-10 performs this scheduling function. In general, each NR NB may control a plurality of cells. To realize ultra-high speed data transmission compared with the existing LTE system, a bandwidth beyond the existing maximum bandwidth can be used, and beamforming can be used together with orthogonal frequency division multiplexing (OFDM) being currently used as a radio access technology. Adaptive Modulation and Coding (AMC) is adopted to determine the modulation scheme and channel coding rate in compliance with the channel condition of the terminal. The NR CN 1a-05 performs functions such as mobility support, bearer setup, and QoS setup. The NR CN 1a-05 is responsible for mobility management and various control functions of the terminal, and can be connected to a plurality of base stations. In addition, the NR system may interwork with the existing LTE system and may be connected via the mobility management entity (MME) 1a-25 and the network interface. The MME can be connected to the eNB 1a-30 being a legacy LTE base station.

The NR system aims to support higher data rates compared with the existing LTE system. To increase the data transmission rate in the NR system, it is considered to transmit a signal using a wide frequency band existing in the frequency band of 6 GHz or more. That is, the NR system considers increasing the transmission rate by using the millimeter wave (mmWave) band such as the 28 GHz band or the 60 GHz band. In the frequency band considered for mmWave, as the signal attenuation rate per distance is relatively large, directional beam-based transmission using multiple antennas is required to ensure the coverage. Directional beam-based transmission has a problem that it is difficult to transmit or receive a signal at a position where no beam is formed, and a beam sweeping technique is used to solve this problem.

Beam sweeping is a process in which the terminal and the TRP sequentially or randomly sweep directional beams with a fixed beam width to determine a transmission beam and a reception beam whose directions are aligned with each other. The TRP is an equipment for transmitting and receiving radio signals in the network as described above and may be a 5G NB or a device connected to the 5G NB.

Figure 1B:
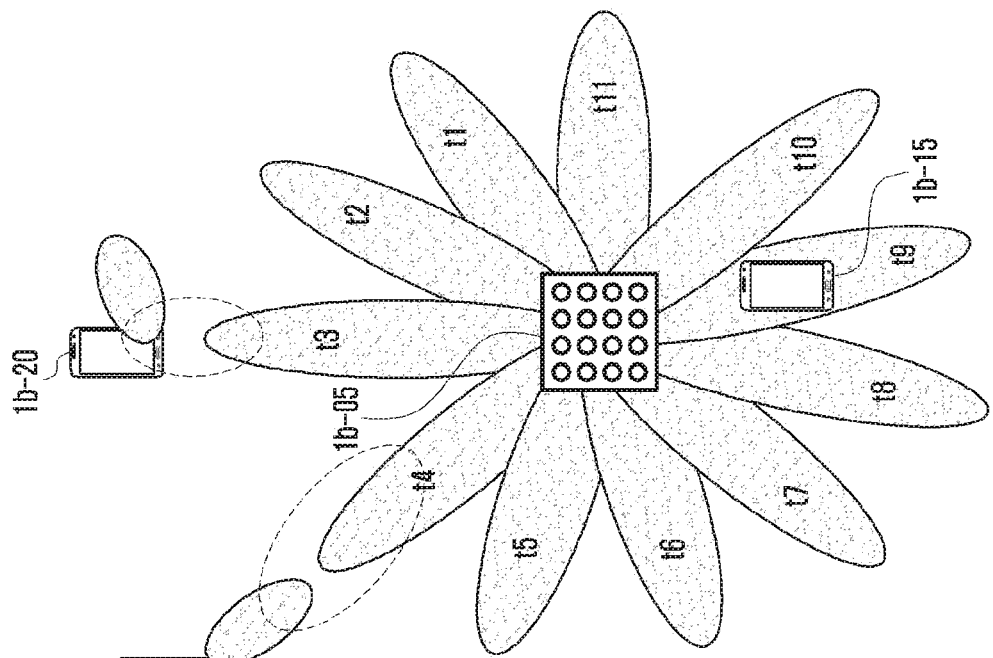
FIG. 1B depicts a beam sweeping procedure.

FIG. 1B depicts a beam sweeping procedure.

In FIG. 1B, the TRP 1b-05 may transmit a transmission beam with a preset width in a specific direction at time t1, transmit a transmission beam with the same width in another direction at time t2, and so on, so that the beam can be transmitted in all directions. For example, the transmission beam signal transmitted by the TRP may reach terminal 1b-15 at time t9 and reach terminal 1b-10 at time t4.

Beam sweeping is mainly used when the base station does not know the direction of the transmission beam to be applied to a terminal, and the common overhead signal destined for a terminal in the idle state is transmitted through beam sweeping.

To increase the beam efficiency, a reception beam as well as a transmission beam may be used. In this case, the direction of the transmission beam and the direction of the reception beam have to be aligned with each other. For example, although a terminal is located in the area of the transmission beam, if the direction of the reception beam is not aligned with the direction of the transmission beam (as indicated by indicia 1b-20), the terminal may fail to receive the transmission beam. On the other hand, when the direction of the transmission beam and the direction of the reception beam are aligned (as indicated by indicia 1b-25), data can be transmitted and received at a much higher efficiency compared with the case where the reception beam is not used.

To find a transmission beam to be aligned with the reception beam, the terminal searches for the optimal transmission and reception beams that provide the best reception quality by matching a plurality of reception beams with a plurality of transmission beams.

Specifically, the terminal may generate n reception beams in different directions, and the TRP may generate k transmission beams in different directions.

Here, the terminal may measure the signal strength of each of n×k downlink beam reference signals (BRSs) received by sequentially or randomly matching the n reception beams with the k transmission beams of the TRP. For example, the measured signal strength may be received signal strength indication (RSSI), carrier to interference and noise ratio (CINR), signal to interference ratio (SIR), and reference signal received power (RSRP) values. Then, the terminal can determine the optimal reception and transmission beams based on the downlink beam reference signal strength values.

The terminal may store information on the optimal reception beam and transmit transmission beam information (e.g., index of the i-th beam with the best signal strength among the k transmission beam patterns) to the TRP.

Thereby, the direction of the reception beam of the terminal and the direction of the transmission beam of the TRP are aligned, and the terminal can receive a downlink signal through the reception beam and the transmission beam.

Meanwhile, the terminal may use the downlink information on the reception beam and the transmission beam for the uplink information on the transmission beam and the reception beam in a corresponding manner.

Figure 2:
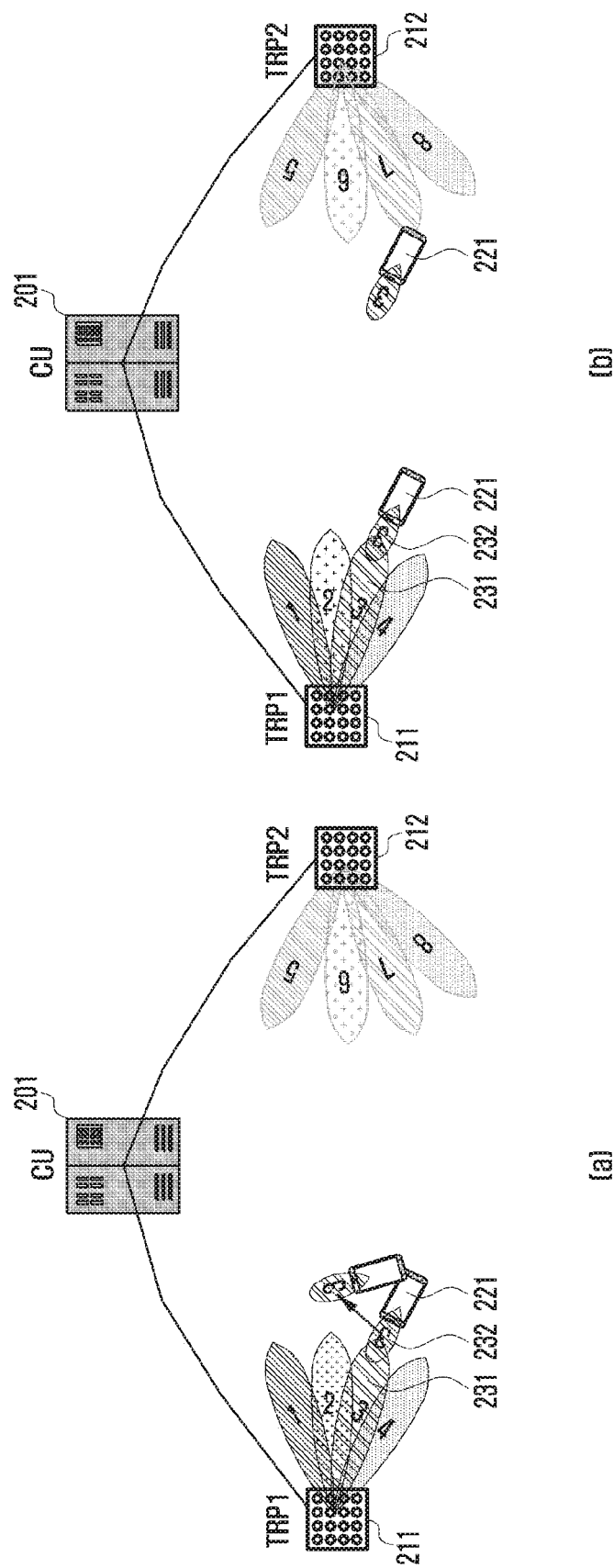
FIG. 2 depicts a beam sweeping procedure in the case of rotation or movement of the terminal.

FIG. 2 depicts beam sweeping in the next generation mobile communication system when the terminal is rotated or moved.

Figure 1B:
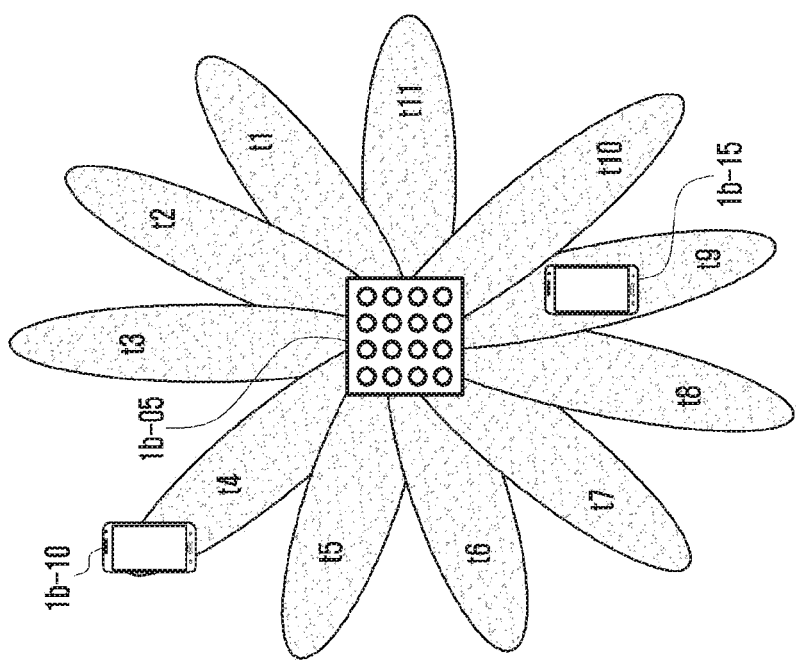

With reference to FIG. 2, the NR system as a wireless communication system may include a central unit (CU) 201, TRPs 211 and 212, and a terminal 221. The CU 201 may include the NR CN in FIG. 1 described above.

In part (a) of FIG. 2, the beam sweeping procedure may be performed and the direction of the transmission beam 231 of the TRP 211 and the direction of the reception beam 232 of the terminal 221 are aligned. In this state, when the terminal 221 is rotated by a certain angle, the direction of the transmission beam 231 of the TRP 211 and the direction of the reception beam 232 of the terminal 221 are misaligned with each other, and the communication quality may deteriorate.

To improve the communication quality, the direction of the transmission beam 231 of the TRP 211 and the direction of the reception beam 232 of the terminal 221 need to be aligned again.

In part (b) of FIG. 2, the beam sweeping procedure is performed and the direction of the transmission beam 231 of the TRP 211 and the direction of the reception beam 232 of the terminal 221 are aligned. In this state, the terminal 221 can be moved. When the terminal 221 is moved and the reception beam 232 of the terminal 221 is outside the area of the transmission beams of the TRP 211, the terminal 221 needs to perform the beam sweeping procedure again with respect to the new TRP 212.

That is, there may arise a need to newly search for the transmission beam of the TRP 212 and the reception beam of the terminal 221 whose directions are aligned with each other.

Accordingly, the present disclosure proposes a method for minimizing deterioration of the communication quality by rapidly aligning the directions of the reception beam 232 of the terminal 221 and the transmission beam of the TRP 211 or 212.

Figure 3:
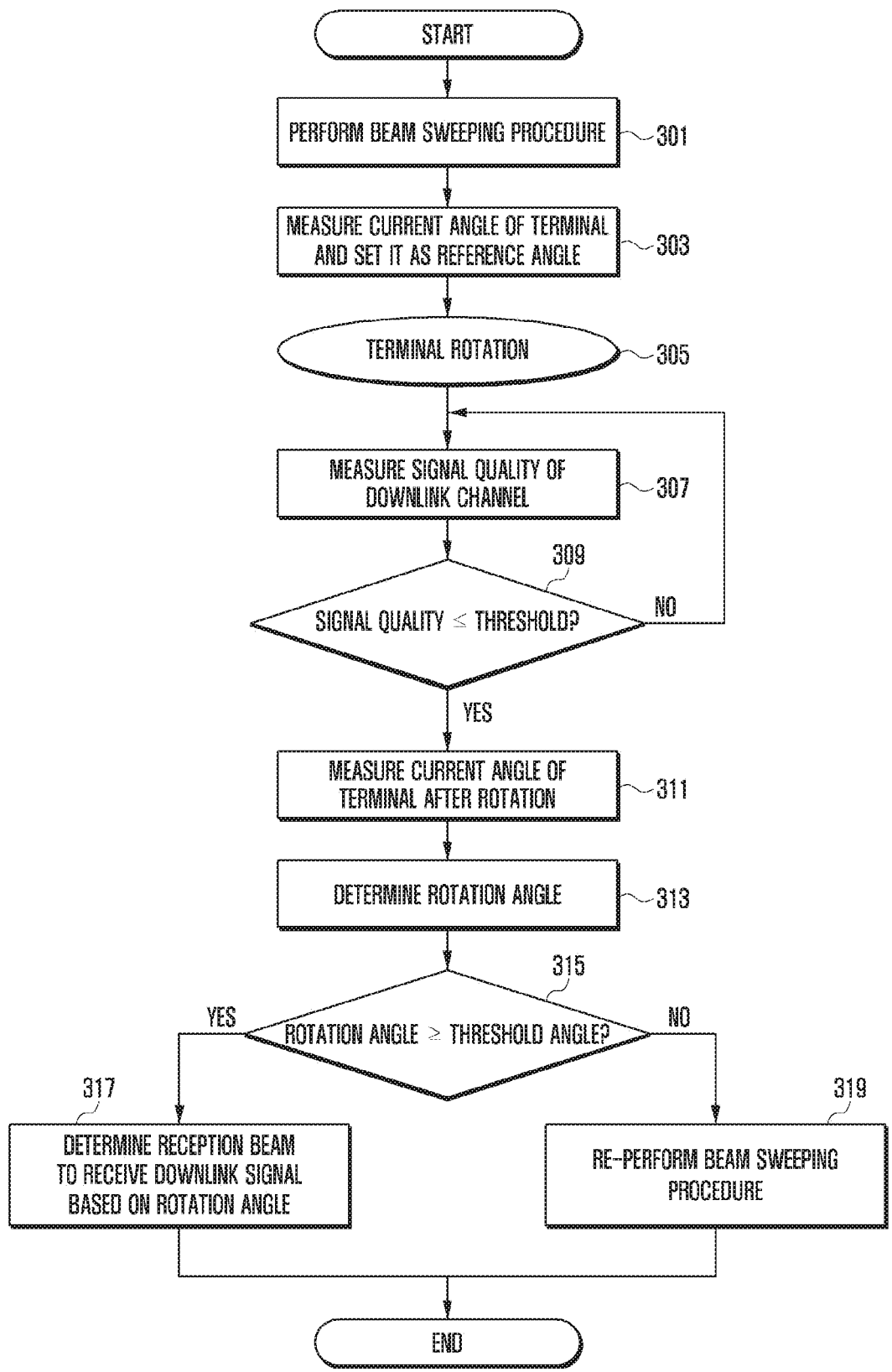
FIG. 3 is a flowchart of a process for aligning the beams between the TRP and the terminal by using a rotation detection sensor according to an embodiment of the present invention.

FIG. 3 is a flowchart of a process for aligning the beams between the TRP and the terminal by using a rotation detection sensor according to an embodiment of the present invention.

At operation 301, the terminal may perform the beam sweeping procedure. Specifically, when HF (high-frequency)/BF (beamforming) wireless communication is started, the terminal may perform the beam sweeping procedure to find a reception beam of the terminal and a transmission beam of the TRP whose directions are aligned. That is, in the beam sweeping procedure, the terminal may measure a reference signal that is transmitted by at least one transmission beam and is received through at least one reception beam, and may determine a beam pair of a transmission beam and a reception beam having the strongest reference signal strength.

At operation 303, the terminal may activate the rotation detection sensor. Then, the terminal may measure the current angle of the terminal using the rotation detection sensor and set it as the reference angle. Meanwhile, the rotation detection sensor may be activated before the beam sweeping procedure.

At operation 305, the terminal may be rotated after the beam sweeping procedure is performed.

At operation 307, the terminal may measure the quality of the downlink channel signal received through the aligned reception and transmission beams.

The signal quality of the downlink channel may be the signal quality in a portion of a subframe of the downlink channel, such as the strength of the beam reference signal (BRS) or the signal quality of at least a portion of the channel state indicator reference signal (CSI-RS). Here, the types of the signal quality may include, but not limited to, the signal to noise ratio (SNR), received signal strength indication (RSSI), carrier to interference and noise ratio (CINR), signal to interference ratio (SIR), and reference signal received power (RSSP).

At operation 309, the terminal may determine whether the measured downlink signal quality is lower than or equal to a preset threshold.

If the downlink signal quality is higher than the threshold, the terminal may determine that the downlink channel condition is acceptable and may continue to measure the quality of the downlink signal.

If the downlink signal quality is lower than or equal to the threshold, at operation 311, the terminal may determine that the downlink channel condition has deteriorated and may measure the current angle of the terminal by using the rotation detection sensor of the terminal.

At operation 313, the terminal may determine the difference between the reference angle measured at operation 303 and the angle measured at operation 311 to be the rotation angle.

At operation 315, the terminal may determine whether the determined rotation angle is greater than or equal to a threshold angle.

If the rotation angle is greater than or equal to the threshold angle, at operation 317, the terminal may determine that the downlink channel condition has deteriorated due to the rotation thereof and may determine a reception beam to receive the downlink signal based on the rotation angle.

Figure 4A:
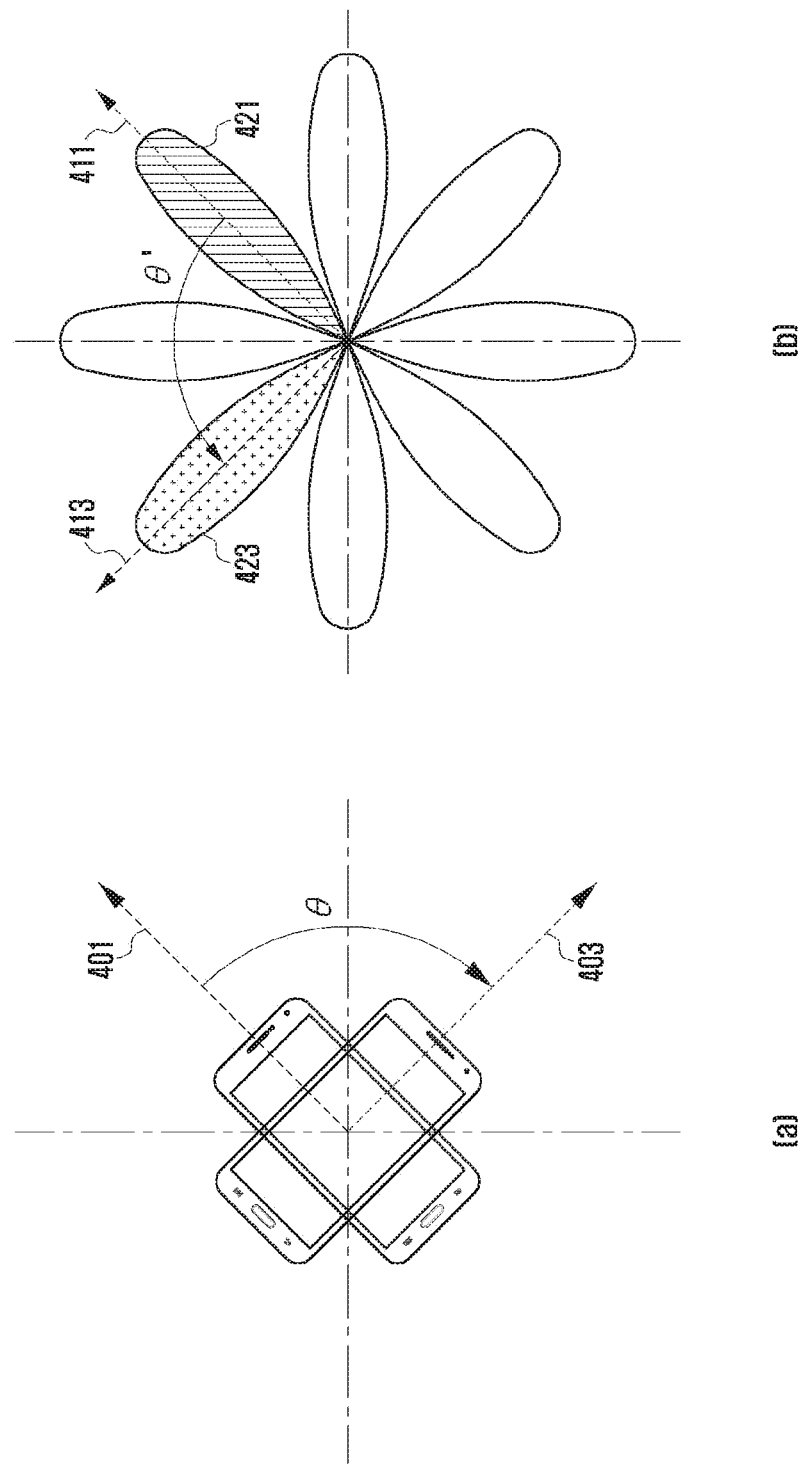
FIGS. 4A and 4B depict a process for determining the reception beam based on the rotation angle according to an embodiment of the present invention.
Figure 4B:
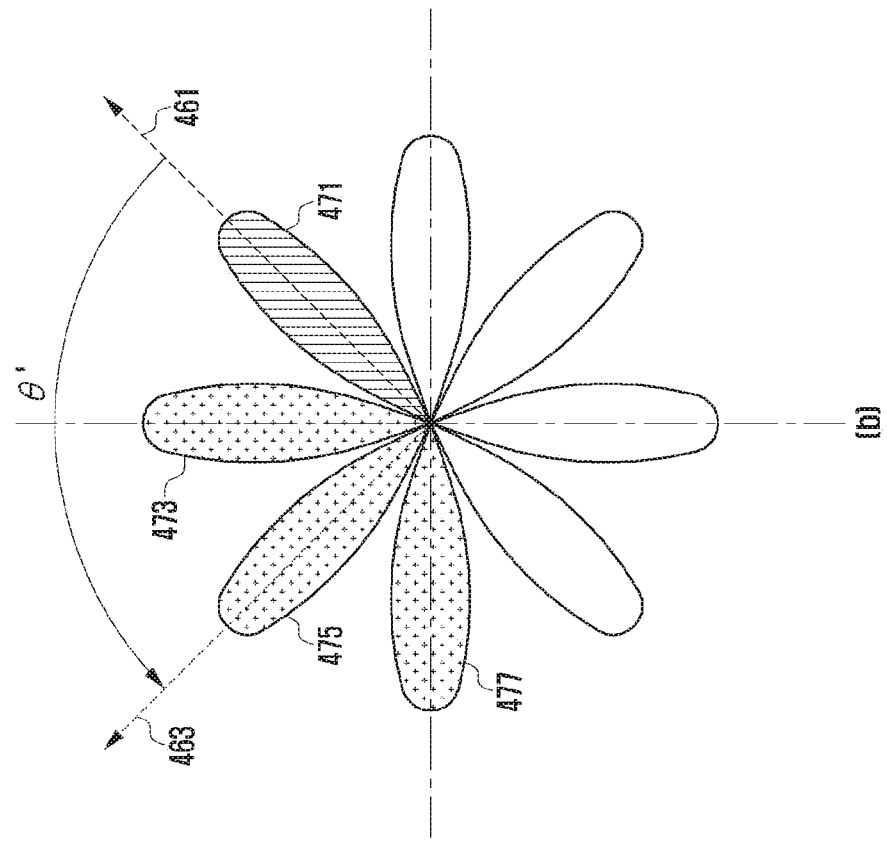
Figure 4B:
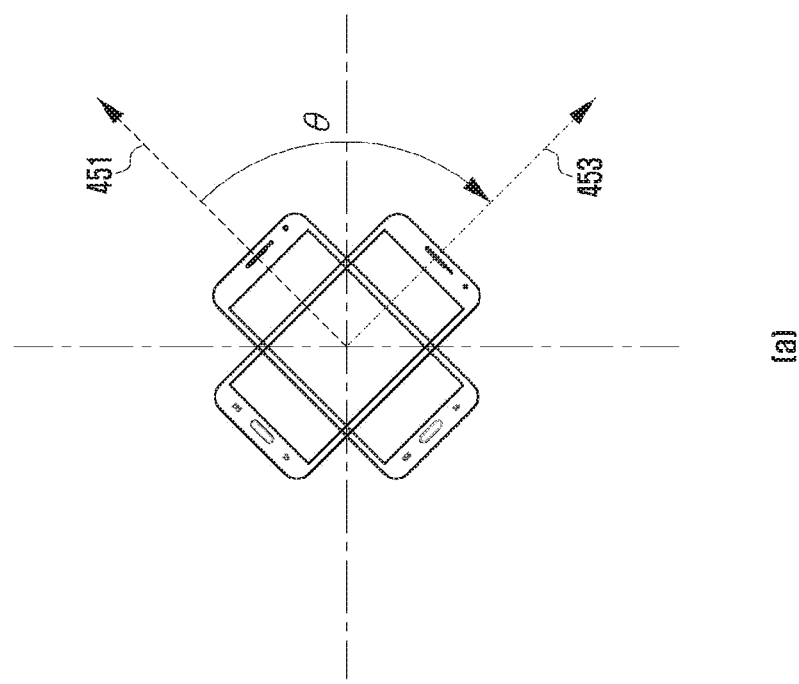

Specifically, FIGS. 4A and 4B depict a process for the terminal to determine the reception beam based on the rotation angle.

In FIG. 4A, the terminal determines a reception beam in the direction corresponding to the rotation angle. In FIG. 4B, the terminal performs a partial beam sweeping procedure for the candidate reception beams corresponding to the rotation angle.

In part (a) of FIG. 4A, the terminal may be oriented in a first direction 401. While the terminal is oriented in the first direction 401, the beam sweeping procedure may be performed and thus the first reception beam 421 oriented in a first direction 411 may be the reception beam for receiving the downlink signal among the reception beams shown in part (b) of FIG. 4A.

In this state, the terminal may be rotated by a first angle (θ) and be oriented in a second direction 403. Then, the terminal may determine a reception beam oriented in a direction corresponding to the rotated first angle (θ).

This can be represented by Equation 1 below.

$$Beam\_{adjusted} = f(\theta Beam\_{current}) \quad \text{[Equation 1]}$$

In Equation 1, θ is the rotation angle, $Beam\_{current}$ is the reception beam determined through the beam sweeping procedure of the terminal before rotation, and $Beam\_{adjusted}$ is the new reception beam determined based on the rotation angle and the previous reception beam to receive the downlink signal.

Specifically, in FIG. 4A, when the terminal in the first direction 401 is rotated by the first angle (θ) and is oriented in the second direction 403, the second reception beam 423 oriented in the second direction 413, which is obtained through rotation in the opposite direction from the first direction 411 by the second angle (θ') corresponding to the first angle (θ), can be determined as the reception beam for receiving the downlink signal. Here, the first angle (θ) and the second angle (θ') may be the same or similar angles, but they may be different angles depending on the realization of the antenna generating the beam.

In FIG. 4B, the terminal performs a partial beam sweeping procedure for the candidate reception beams corresponding to the rotation angle.

In part (a) of FIG. 4B, the terminal may be oriented in a first direction 451. While the terminal is oriented in the first direction 451, the beam sweeping procedure may be performed and thus the first reception beam 471 oriented in a first direction 461 may be the reception beam for receiving the downlink signal among the candidate reception beams shown in part (b) of FIG. 4B.

In this state, the terminal may be rotated by a first angle (θ) and be oriented in a second direction 453. In this case, the terminal may perform a partial beam sweeping procedure on the candidate reception beams corresponding to the first angle (θ).

Specifically, in FIG. 4B, when the terminal in the first direction 451 is rotated by the first angle (θ) and is oriented in the second direction 453, the reception beams 473,475 and 477 oriented in or close to the second direction 463, which is obtained through rotation in the opposite direction from the first direction 461 by the second angle (θ') corresponding to the first angle (θ), can be selected as candidate reception beams. Here, the first angle (θ) and the second angle (θ') may be the same or similar angles, but they may be different angles depending on the realization of the antenna generating the beam.

After selecting the candidate reception beams 473, 475 and 477, the terminal may determine a reception beam to receive the downlink signal by performing a partial beam sweeping procedure on the candidate reception beams 473, 475 and 477.

For example, while sequentially or randomly selecting one of the candidate reception beams 473, 475 and 477, the terminal can measure the signal strength of the downlink beam reference signal corresponding to the selected candidate reception beam. Then, the terminal can determine the optimal reception and transmission beams based on the downlink beam reference signal strengths.

With reference back to FIG. 3, if the rotation angle is less than the threshold angle at operation 315, the terminal may determine that the downlink channel condition has deteriorated due to a change in position of the terminal.

That is, as it is determined that it is difficult to achieve alignment between the reception beam and the transmission beam only through adjustment of the reception beam, at operation 319, the terminal can re-perform the beam sweeping procedure.

In various embodiments, when the position of the terminal changes mainly, the quality of the downlink signal through the reception beam and the transmission beam may deteriorate.

However, the quality of the downlink signal may change regardless of the position of the terminal. For example, if the communication is temporarily blocked by an obstacle, the quality of the downlink reference signal may be changed.

As another example, to reduce consumption of resources (battery or time), the terminal may operate in the discontinuous reception (DRX) mode where the reception module Rx is activated only when data is transmitted. In this case, when the reception module Rx is activated again from the sleep state, the beam sweeping procedure is repeatedly performed and the communication may be delayed.

Additionally, there may be a difference between the signal strength according to the actual movement of the terminal and the signal strength measured by the terminal. For example, as the signal strength measured by the terminal is based on the previous value and the average value of the signal strength, it may be difficult to reflect the signal strength of the terminal in real time.

Accordingly, a scheme may be considered in which the terminal selectively performs the beam sweeping procedure in consideration of the degree of movement of the terminal.

Figure 5:
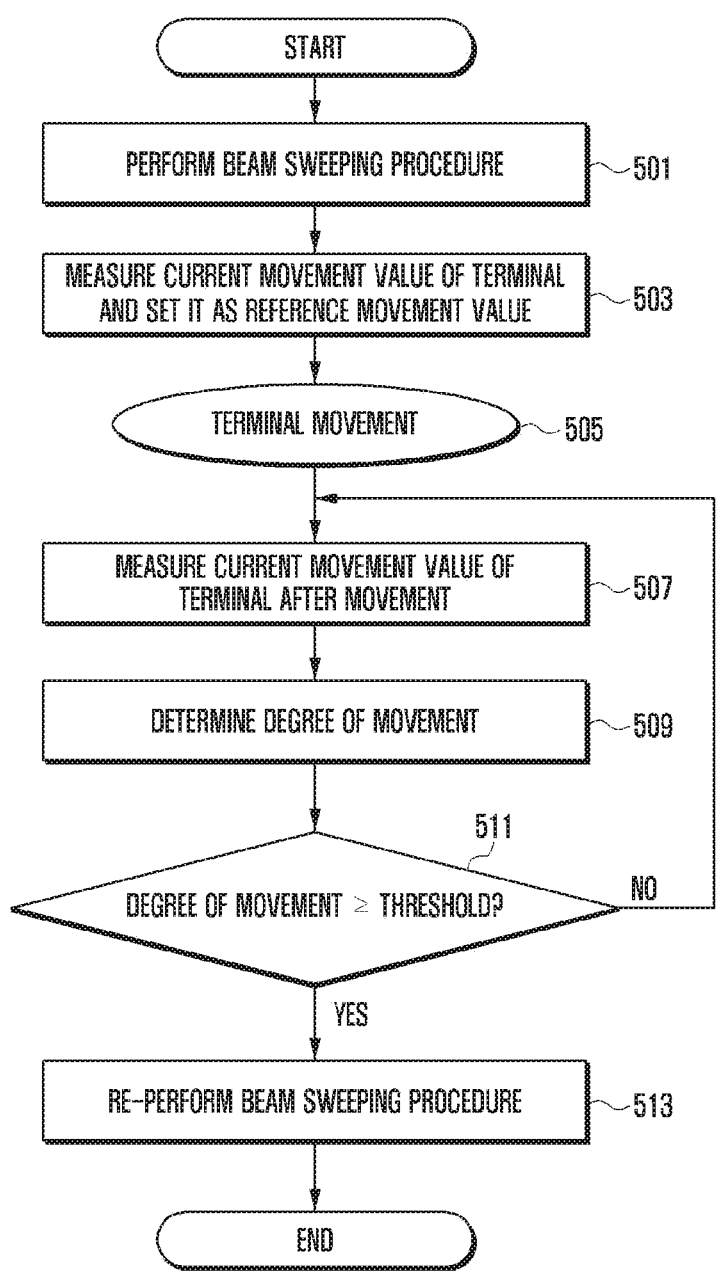
FIG. 5 is a flowchart of a process for aligning the beams between the TRP and the terminal by using a movement detection sensor according to an embodiment of the present invention.

To handle the above situation, FIG. 5 is a flowchart of a process for aligning the beams between the TRP and the terminal by using a movement detection sensor according to an embodiment of the present invention.

At operation 501, when wireless communication is started, the terminal can perform the beam sweeping procedure to find a reception beam of the terminal and a transmission beam of the TRP whose directions are aligned with each other. In the beam sweeping procedure, the terminal may measure a reference signal that is transmitted by at least one transmission beam and is received through at least one reception beam, and may determine a beam pair of a transmission beam and a reception beam having the strongest reference signal strength.

At operation 503, the terminal may activate the movement detection sensor. Then, the terminal can measure the current movement value of the terminal using the movement detection sensor and set it as the reference movement value. The movement value may be, for example, the position of the terminal, the altitude of the terminal, or the number of walking steps counted by the terminal. Meanwhile, the movement detection sensor may be activated before the beam sweeping procedure.

At operation 505, the terminal may be moved after the beam sweeping procedure is performed.

At operation 507, the terminal can measure the current movement value of the terminal after movement by using the movement detection sensor.

At operation 509, the terminal may determine the difference between the movement value measured at operation 503 and the movement value measured at operation 507 as the degree of movement.

For example, if the movement values are the positions of the terminal before and after the movement, the degree of movement can be the distance traveled. If the movement values are the altitudes of the terminal before and after the movement, the degree of movement may be the movement height. If the movement values are the numbers of steps of the user measured by a pedometer before and after walking, the degree of movement may be the difference in the number of steps taken by the user.

At operation 511, the terminal can determine whether the determined degree of movement is greater than or equal to a threshold value.

If the degree of movement is greater than or equal to the threshold value, at operation 513, the terminal may re-perform the beam sweeping procedure.

If the degree of movement is less than the threshold value, the terminal may continue to measure the movement value thereof.

Figure 6:
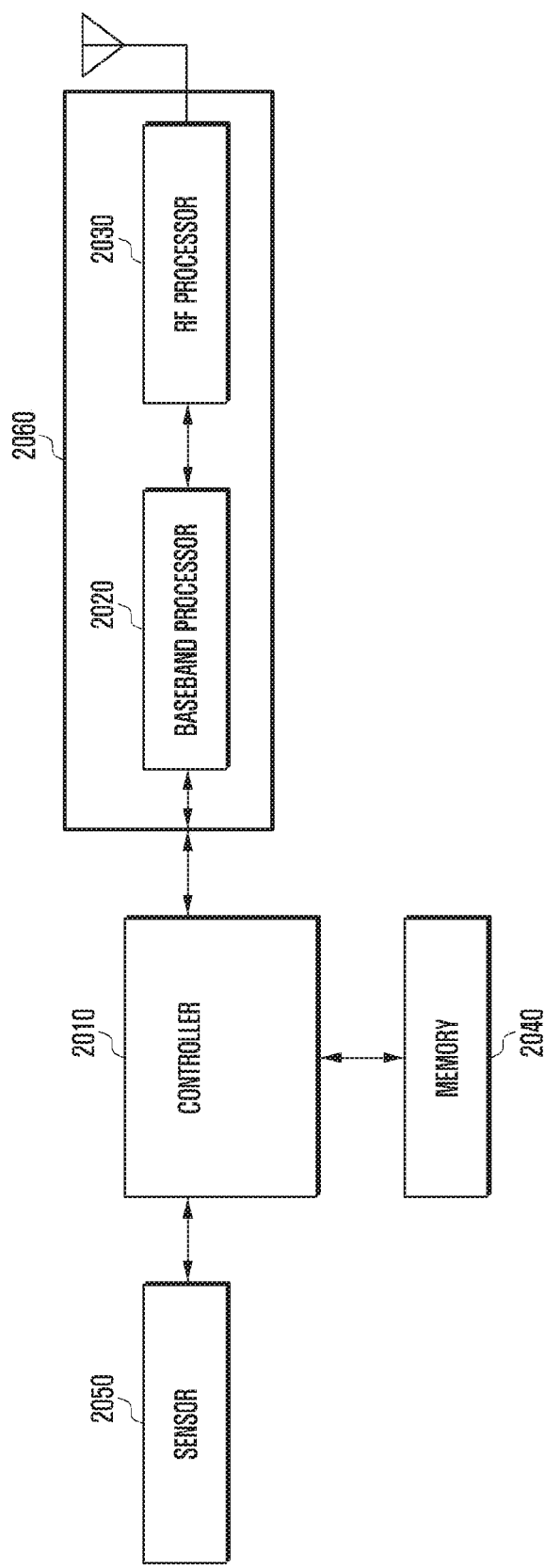
FIG. 6 is a block diagram of a terminal according to an embodiment of the present invention.

FIG. 6 is a block diagram of a terminal in a wireless communication system of the present invention.

With reference to FIG. 6, the terminal includes a radio frequency (RF) processor 2030, a baseband processor 2020, a memory 2040, a sensor 2050, and a controller 2010.

The RF processor 2030 performs a function for transmitting and receiving a signal through a radio channel such as band conversion and amplification of a signal. That is, the RF processor 2030 upconverts a baseband signal from the baseband processor 2020 into an RF band signal and transmits the RF band signal through the antenna, and downconverts an RF band signal received through the antenna to a baseband signal. For example, the RF processor 2030 may include a transmit filter, a receive filter, an amplifier, a mixer, an oscillator, a digital to analog converter (DAC), and an analog to digital converter (ADC). Although only one antenna is shown, the terminal may have multiple antennas. The RF processor 2030 may include a plurality of RF chains. The RF processor 2030 may perform beamforming. For beamforming, the RF processor 2030 can adjust the phase and magnitude of each of signals transmitted and received through a plurality of antennas or antenna elements. The RF processor 2030 may perform MIMO, and may receive plural layers during MIMO operation. The RF processor 2030 may perform reception beam sweeping by appropriately configuring a plurality of antennas or antenna elements, or may adjust the direction and width of the reception beams to align the reception beam with the transmission beam under the control of the controller.

The baseband processor 2020 performs conversion between a baseband signal and a bit string according to the physical layer specification. For example, for data transmission, the baseband processor 2020 generates complex symbols by encoding and modulating a transmission bit stream. For data reception, the baseband processor 2020 recovers the received bit stream by demodulating and decoding the baseband signal provided from the RF processor 2030. For example, in the case of orthogonal frequency division multiplexing (OFDM), for data transmission, the baseband processor 2020 generates complex symbols by encoding and modulating a transmission bit stream, maps the complex symbols to subcarriers, and composes OFDM symbols through inverse fast Fourier transform (IFFT) and cyclic prefix (CP) insertion. For data reception, the baseband processor 2020 divides the baseband signal provided from the RF processor 2030 into OFDM symbols, recovers signals mapped to subcarriers through fast Fourier transform (FFT), and restores the received bit stream through demodulation and decoding.

The baseband processor 2020 and the RF processor 2030 transmit and receive signals as described above. Hence, the baseband processor 2020 and the RF processor 2030 may be referred to as a transmitter, a receiver, a transceiver, or a transceiver 2060. The transceiver 2060 can communicate with an external node. The external node may be, for example, a TRP base station of the present invention, a common control function providing device, a network slice management device, or a third party server. When the transceiver 2060 communicates with an external node, it may communicate with the external node via an intermediary medium.

Meanwhile, at least one of the baseband processor 2020 or the RF processor 2030 may include a plurality of communication modules to support different radio access technologies. Also, at least one of the baseband processor 2020 and the RF processor 2030 may include different communication modules to process signals of different frequency bands. For example, the different radio access technologies may include an LTE network and an NR network. The different frequency bands may include a super high frequency (SHF) band (e.g., 2.5 GHz, 5 GHz) and a millimeter wave band (e.g., 60 GHz).

The memory 2040 stores data such as basic programs, application programs, and configuration information needed for operating the terminal. The memory 2040 provides stored data at the request of the controller 2010. The memory 2040 may include, for example, an internal memory and an external memory. The internal memory can include, for example, a volatile memory (e.g., DRAM, SRAM, or SDRAM) or a nonvolatile memory (e.g., one time programmable ROM (OTPROM), PROM, EPROM, EEPROM, mask ROM, flash ROM, flash memory, hard drive, or solid state drive (SSD)). The external memory may include a flash drive, such as compact flash (CF), secure digital (SD), micro-SD, mini-SD, extreme digital (xD), multi-media card (MMC), or memory stick. The external memories may be functionally or physically connected to the terminal through various types of interfaces.

The sensor 2050 can measure the angle, movement value, and posture of the terminal. For example, the sensor 2050 can measure a physical quantity or measure the operating state of the terminal and convert the measured or sensed information into an electrical signal.

The rotation detection sensor (not shown) of the sensor 2050 can measure the angle of the terminal. The rotation detection sensor may include at least one of a gyro sensor, an acceleration sensor, or a geomagnetic sensor. The movement detection sensor (not shown) may include at least one of a positioning sensor (e.g., Global Positioning System (GPS), Global Navigation Satellite System (Glonass), Beidou Navigation Satellite System (Beidou), or European global satellite-based navigation system (Galileo)), an air pressure sensor, or a pedometer.

The controller 2010 controls overall operations of the terminal. For example, the controller 2010 transmits and receives signals through the transceiver 2060. Also, the controller 2010 writes and reads data to and from the memory 2040. To this end, the controller 2010 may include at least one processor. For example, the controller 2010 may include a communication processor (CP) for communication control and an application processor (AP) for controlling higher layers such as application programs.

In various embodiments, the controller 2010 may perform the beam sweeping procedure to find the reception beam of the terminal and the transmission beam of the TPR whose directions are aligned with each other. When the terminal is rotated after the beam sweeping procedure is performed, the controller 2010 can determine the rotation angle of the terminal by using the sensor 2050 (e.g., rotation detection sensor). Here, the rotation angle may be the difference between the angle of the terminal measured before the rotation and the angle of the terminal measured after the rotation.

If the determined rotation angle is greater than or equal to a threshold angle, the controller 2010 can determine a reception beam to receive the downlink signal based on the determined rotation angle. For example, the controller 2010 can determine a reception beam in a direction corresponding to the rotation angle. Alternatively, the controller 2010 may perform a partial beam sweeping procedure on plural candidate reception beams corresponding to the rotation angle to determine a reception beam to receive the downlink signal.

If the determined rotation angle is less than the threshold angle, the controller 2010 can re-perform the beam sweeping procedure.

In various embodiments, the controller 2010 may measure the signal quality of the downlink signal received through the reception beam and the transmission beam, and may determine the rotation angle of the terminal if the measured signal quality is less than or equal to a threshold value.

In various embodiments, the controller 2010 may perform the beam sweeping procedure to find the reception beam of the terminal and the transmission beam of the TPR whose directions are aligned with each other. When the terminal is moved after the beam sweeping procedure is performed, the controller 2010 can determine the degree of movement of the terminal by using the sensor 2050 (e.g., movement detection sensor). If the determined degree of movement is greater than or equal to a threshold value, the controller 2010 may perform the beam sweeping procedure. Here, the degree of movement may be the difference between the movement value of the terminal measured before the movement and the movement value of the terminal measured after the movement.

Figure 7:
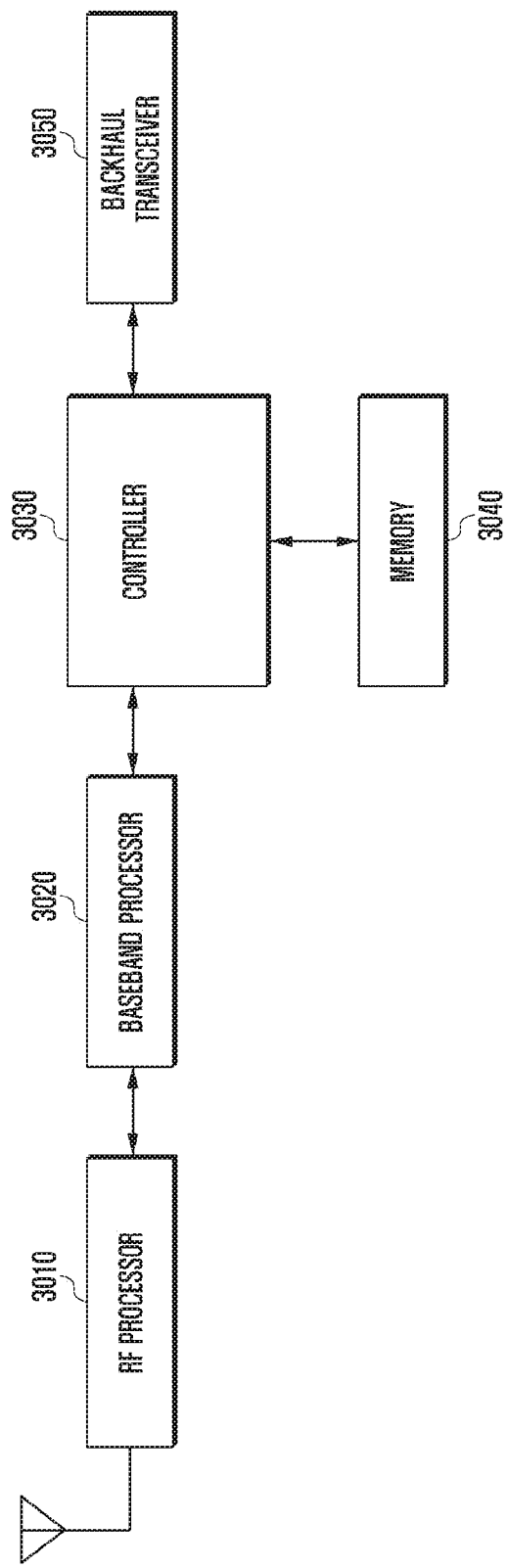
FIG. 7 is a block diagram of a TRP according to an embodiment of the present invention.

FIG. 7 is a block diagram of a TRP (e.g., base station) in a wireless communication system of the present invention.

As shown in FIG. 7, the TRP includes an RF processor 3010, a baseband processor 3020, a backhaul transceiver 3050, a memory 3040, and a controller 3030.

The RF processor 3010 performs a function for transmitting and receiving a signal through a radio channel such as band conversion and amplification of a signal. That is, the RF processor 3010 upconverts a baseband signal from the baseband processor 3020 into an RF band signal and transmits the RF band signal through the antenna, and downconverts an RF band signal received through the antenna to a baseband signal. For example, the RF processor 3010 may include a transmit filter, a receive filter, an amplifier, a mixer, an oscillator, a DAC, and an ADC. Although only one antenna is shown, the TRP may have multiple antennas. The RF processor 3010 may include a plurality of RF chains. The RF processor 3010 may perform beamforming. For beamforming, the RF processor 3010 can adjust the phase and magnitude of each of signals transmitted and received through a plurality of antennas or antenna elements. The RF processor 3010 may perform downlink MIMO by transmitting one or more layers.

The baseband processor 3020 performs conversion between a baseband signal and a bit string according to the physical layer specification. For example, for data transmission, the baseband processor 3020 generates complex symbols by encoding and modulating a transmission bit stream. For data reception, the baseband processor 3020 recovers the received bit stream by demodulating and decoding the baseband signal provided from the RF processor 3010. For example, in the case of OFDM, for data transmission, the baseband processor 3020 generates complex symbols by encoding and modulating a transmission bit stream, maps the complex symbols to subcarriers, and composes OFDM symbols through IFFT and CP insertion. For data reception, the baseband processor 3020 divides the baseband signal provided from the RF processor 3010 into OFDM symbols, recovers signals mapped to subcarriers through FFT, and restores the received bit stream through demodulation and decoding. The baseband processor 3020 and the RF processor 3010 transmit and receive signals as described above. Hence, the baseband processor 3020 and the RF processor 3010 may be referred to as a transmitter, a receiver, a transceiver, or a transceiver.

The memory 3040 stores data such as basic programs, application programs, and configuration information needed for operating the TRP. In particular, the memory 3040 may store information on the bearers allocated to connected terminals and measurement results reported from the connected terminals. The memory 3040 may also store information on the criterion to determine whether to configure a multi-connectivity feature to the terminal. The memory 3040 provides stored data at the request of the controller 3030.

The controller 3030 controls overall operations of the TRP. For example, the controller 3030 transmits and receives signals through the baseband processor 3020 and the RF processor 3010 or through the backhaul transceiver 3030. The controller 3030 writes and reads data to and from the memory 3040. To this end, the controller 3030 may include at least one processor.

In various embodiments, when the terminal determines a reception beam and a transmission beam whose directions are aligned through the beam sweeping procedure, the information on the transmission beam can be sent to the TRP. In this case, the controller 3030 of the TRP can transmit the downlink signal to the terminal through the transmission beam corresponding to the received transmission beam information.

Figure 8:
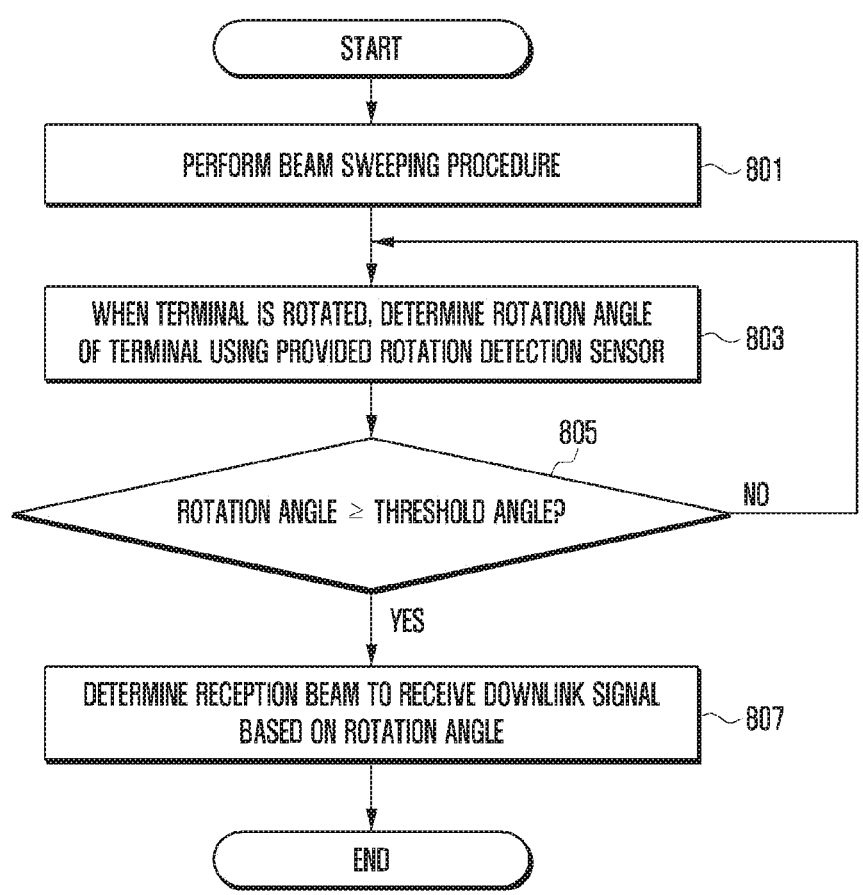
FIG. 8 is a flowchart of a method for the terminal to determine the beam according to an embodiment of the present invention.

FIG. 8 is a flowchart of a method for the terminal to determine the beam according to an embodiment of the present invention.

At operation 801, the terminal can perform the beam sweeping procedure. In the beam sweeping procedure, the terminal may find a reception beam of the terminal and a transmission beam of the TRP whose directions are aligned with each other. That is, in the beam sweeping procedure, the terminal may measure a reference signal that is transmitted by at least one transmission beam and is received through at least one reception beam, and may determine a beam pair of a transmission beam and a reception beam having the strongest reference signal strength.

Thereafter, at operation 803, when the terminal is rotated, the terminal can determine the rotation angle of the terminal by using the rotation detection sensor of the terminal. Here, the rotation detection sensor may include at least one of a gyro sensor, an acceleration sensor, or a geomagnetic sensor. The rotation angle may be the difference between the angle of the terminal measured before the rotation and the angle of the terminal measured after the rotation.

At operation 805, the terminal may determine whether the rotation angle is greater than or equal to a threshold angle.

If the rotation angle is greater than or equal to the threshold angle, at operation 807, the terminal may determine a reception beam to receive the downlink signal based on the rotation angle.

For example, the terminal may determine a reception beam whose direction corresponds to the rotation angle. Alternatively, the terminal may determine a reception beam to receive the downlink signal by performing a partial beam sweeping procedure on candidate reception beams corresponding to the rotation angle.

On the other hand, if the rotation angle is less than the threshold angle, the terminal can re-perform the beam sweeping procedure.

In various embodiments, the terminal may perform the beam sweeping procedure as at operation 801 and measure the signal quality of the downlink signal received through the reception beam and the transmission beam. If the measured signal quality is less than or equal to the threshold value, the terminal can determine the rotation angle of the terminal as at operation 803.

Figure 9:
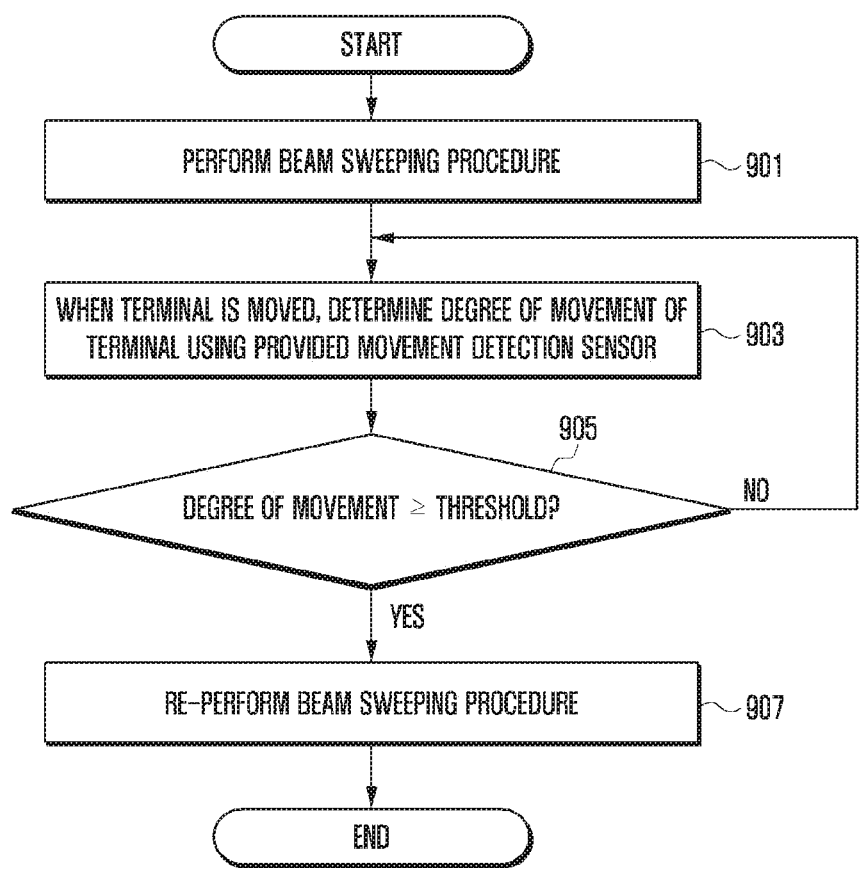
FIG. 9 is a flowchart of a method for the terminal to determine the beam according to another embodiment of the present invention.

FIG. 9 is a flowchart of a method for the terminal to determine the beam according to another embodiment of the present invention.

At operation 901, the terminal can perform the beam sweeping procedure. In the beam sweeping procedure, the terminal may find a reception beam of the terminal and a transmission beam of the TRP whose directions are aligned with each other. That is, in the beam sweeping procedure, the terminal may measure a reference signal that is transmitted by at least one transmission beam and is received through at least one reception beam, and may determine a beam pair of a transmission beam and a reception beam having the strongest reference signal strength.

Thereafter, at operation 903, when the terminal is moved, the terminal can determine the degree of movement of the terminal by using the movement detection sensor of the terminal. Here, the degree of movement may be the difference between the movement value of the terminal measured before the movement and the movement value of the terminal measured after the movement. The degree of movement can be the distance traveled of the terminal, the movement height of the terminal, or the difference in the number of steps taken by the user.

At operation 905, the terminal can determine whether the degree of movement is greater than or equal to a threshold value.

If the degree of movement is greater than or equal to the threshold value, at operation 907, the terminal may re-perform the beam sweeping procedure.

According to an embodiment of the present invention, at least some of the components (e.g., modules or functions) or methods (e.g., operations) of the wireless communication system may be implemented as instructions in the form of a program module, which can be stored in a non-transitory computer readable memory medium. When the instructions are executed by a processor, the processor may carry out functions corresponding to the instructions.

Programs or program modules may be stored in a non-transitory computer readable memory medium, and can be read and executed by a computer to thereby realize a specific embodiment of the present invention.

A non-transitory memory medium refers to a medium that semi-permanently stores data and is readable by a device, and may include a volatile or nonvolatile memory that temporarily stores data for computation or transmission, such as a register, cache, or buffer. On the other hand, transitory transmission media such as signals or currents are not a non-transitory memory medium.

For distribution, the program modules described above may be stored in a non-transitory memory medium, such as a CD, DVD, hard disk, Blu-ray disc, USB, internal memory of the device of the present invention, memory card, ROM or RAM.

The programs described above may be stored in the memory of a server and be downloaded to a terminal (e.g. device of the present invention) connected to the server via a network for sale. The programs may be uploaded to the server for transfer or registration by the program provider (e.g. program developer or manufacturer).

When the programs described above are provided to a terminal for sale, at least a portion of the programs may be temporarily stored in the buffer of the server for transmission. In this case, the buffer of the server may be a non-transitory memory medium of the present invention.

In one embodiment, a non-transitory computer readable memory medium may store a program that, when executed, causes a terminal to: perform a beam sweeping procedure to find a reception beam of the terminal and a transmission beam of a TRP whose directions are aligned with each other; determine, when the terminal is rotated after performing the beam sweeping procedure, the rotation angle of the terminal by using a rotation detection sensor of the terminal; and determine, if the rotation angle is greater than or equal to a threshold angle, a reception beam to receive the downlink signal based on the rotation angle.

In another embodiment, a non-transitory computer readable memory medium may store a program that, when executed, causes a terminal to: perform a beam sweeping procedure to find a reception beam of the terminal and a transmission beam of a TRP whose directions are aligned with each other; determine, when the terminal is moved after performing the beam sweeping procedure, the degree of movement of the terminal by using a movement detection sensor of the terminal; and re-perform, if the degree of movement is greater than or equal to a threshold value, the beam sweeping procedure.

Hereinabove, the present invention has been shown and described with reference to various embodiments thereof. It should be understood by those skilled in the art that many variations and modifications of the method and apparatus described herein will still fall within the spirit and scope of the present invention as defined in the appended claims and their equivalents.

The invention claimed is:

1. A method performed by a terminal in a wireless communication system, the method comprising:
    performing a beam sweeping procedure to determine a reception beam of the terminal and a transmission beam of a transmission reception point (TRP), wherein the determined reception beam corresponds to the determined transmission beam;
    identifying a power of a reference signal, which is transmitted on the determined transmission beam, received based on the determined reception beam;
    identifying a rotation angle of the terminal based on a rotation detection sensor of the terminal in case that the power is less than or equal to a threshold;
    in case that the rotation angle is greater than or equal to a rotation threshold, determining a reception beam corresponding to the rotation angle;
    in case that the rotation angle is less than the rotation threshold, identifying a movement value of the terminal based on a movement detection senor of the terminal; and
    in case that the movement value of the terminal is neater than or equal to a movement threshold, performing a beans sweeping procedure to determine a reception beam and a transmission beam.

2. The method of claim 1,
    wherein the rotation angle is the difference between an angle of the terminal measured before a rotation and an angle of the terminal measured after the rotation.

3. The method of claim 1, wherein determining the reception beam corresponding to the rotation angle comprises determining the reception beam whose direction corresponds to the rotation angle.

4. The method of claim 1, wherein determining the reception beam corresponding to the rotation angle comprises:
    determining the reception beam by performing a beam sweeping procedure for reception beam candidates, the reception beam candidates being identified among reception beams of the terminal based on the rotation angle, and
    wherein the rotation detection sensor includes at least one of a gyro sensor, an acceleration sensor, or a geomagnetic sensor.

5. The method of claim 1, wherein the movement value is a difference between a movement value of the terminal measured before a movement and a movement value of the terminal measured after the movement, and
    wherein the movement includes a movement distance of the terminal, a movement height of the terminal, or a number of steps of the terminal.

6. A terminal in a wireless communication system, the terminal comprising:
    a sensor configured to measure at least one of a rotation angle of the terminal and a movement value of the terminal;
    a transceiver; and
    a controller coupled with the transceiver and configured to:
    perform a beam sweeping procedure to determine a reception beam of the terminal and a transmission beam of a transmission reception point (TRP), wherein the determined reception beam corresponds to the determined transmission beam,
    identity a power of a reference signal, which is transmitted on the determined transmission beam, received based on the determined reception beam,
    identify the rotation angle based on the sensor in case that the power is less than or equal to a threshold,
    in case that the rotation angle is greater than or equal to a rotation threshold, determine a reception beam corresponding to the rotation angle,
    in case that the rotation angle is less than the rotation threshold, identify the movement value based on the sensor, and
    in case that the movement value of the terminal is greater than or equal to a movement threshold, perform a beam sweeping procedure to determine a reception beam and a transmission beam.

7. The terminal of claim 6, wherein the rotation angle is the difference between an angle of the terminal measured before a rotation and an angle of the terminal measured after the rotation.

8. The terminal of claim 6, wherein the controller is configured to determine the reception beam whose direction corresponds to the rotation angle.

9. The terminal of claim 6, wherein the controller is configured to determine the reception beam by performing a beam sweeping procedure for reception beam candidates, the reception beam candidates being identified among reception beams of the terminal based on the rotation angle, and
    wherein the sensor includes at least one of a gyro sensor, an acceleration sensor, or a geomagnetic sensor.

10. The terminal of claim 6, wherein the movement value is a difference between a movement value of the terminal measured before a movement and a movement value of the terminal measured after the movement, and wherein the movement value includes to a movement distance of the terminal, a movement height of the terminal, or a number of steps of the terminal.

\* \* \* \* \*